Figure 1:
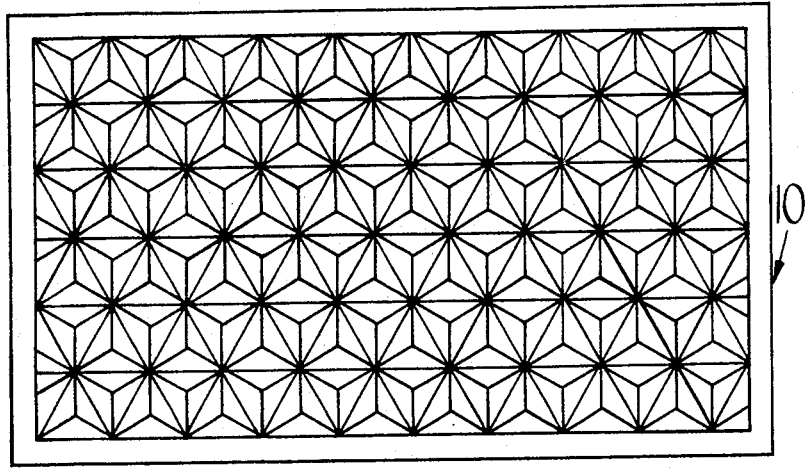

United States Patent [19]
Beasley

[11] 3,748,724
[45] July 31, 1973

[54] REFLECTOR PANELS FOR ROAD VEHICLES

[76] Inventor: Maurice Trevor Beasley, 2 Amos Ave., Nuneaton, England

[22] Filed: May 10, 1971

[21] Appl. No.: 141,822

[30] Foreign Application Priority Data
May 19, 1970 Great Britain.................24,043/70

[52] U.S. Cl............................ 29/558, 83/1, 350/103
[51] Int. Cl............................................. B23p 13/04
[58] Field of Search .................... 29/558, 557; 83/1, 83/5; 350/103; 264/1, 219; 425/808; 18/DIG. 30

[56] References Cited
UNITED STATES PATENTS

| | | | |
|---|---|---|---|
| 1,591,572 | 7/1926 | Stimson | 65/362 |
| 1,950,560 | 3/1934 | Martinek et al. | 350/103 |
| 2,205,638 | 6/1940 | Stimson | 350/103 |
| 2,441,747 | 5/1948 | Beshgetoor | 76/107 |
| 2,676,518 | 4/1954 | Rupert | 350/103 |
| 2,875,543 | 3/1959 | Sylvester et al. | 41/19 |
| 3,110,816 | 11/1963 | Kaisler et al. | 250/227 |
| 3,450,459 | 6/1969 | Haggerty | 350/103 |
| 3,525,145 | 8/1970 | Bonnefoy et al. | 29/558 |
| 3,528,665 | 9/1970 | Redlich | 29/558 X |

*Primary Examiner*—Charles W. Lanham
*Assistant Examiner*—V. A. DiPalma
*Attorney*—Holman & Stern

[57] ABSTRACT

In a method of manufacturing a mould part for use in the manufacture of a reflector panel for a road vehicle, a body is located in a first position relative to a rotatable cutting tool, the body having a substantially flat surface and the cutting tool having a cutting insert of triangular cross section. The cutting tool is rotated whilst relative movement is provided between the body and the tool in a first direction parallel with the flat surface of the body so that a first set of parallel, spaced grooves of triangular cross section and of equal depth are cut in the flat surface of the body. The body is then rotated relative to the cutting tool to a second position angularly spaced from the first position by an angle of 60° as measured about an axis at right angles to the flat surface of the body. Then, with the body in said second position, a second set of parallel, spaced grooves of triangular cross section are formed in the flat surface of the body in the same way as the first set of grooves, the grooves of the second set being of the same depth as the grooves of the first set. The body is then further rotated relative to the cutting tool to a third position angularly spaced from each of the first and second positions by an angle of 60° as measured about the axis at right angles to the flat surface of the body. A third set of parallel, spaced grooves of triangular cross section is now formed in said surface of the body in the same manner as the first and second set of grooves, the grooves of the third set being the same depth as the grooves of the first and second sets. Finally the grooved surface of the body is used as a pattern to produce the required mould part, which can then be used in the manufacture of a reflector panel for a road vehicle.

1 Claim, 3 Drawing Figures

REFLECTOR PANELS FOR ROAD VEHICLES

This invention relates to reflector panels for road vehicles and to mould parts for use in the manufacture of reflector panels for road vehicles.

In one aspect, the invention resides in a method of manufacturing a mould part for use in the manufacture of a reflector panel for a road vehicle, comprising the steps of:

a. locating a body in a first position relative to a rotatable cutting tool, the body having a substantially flat surface and the cutting tool carrying a cutting insert of triangular cross section, b. rotating the cutting tool whilst providing relative movement between the body and the tool in a first direction parallel with said flat surface of the body so as to cut a first set of parallel, spaced grooves of triangular cross section and of equal depth in said surface of the body, c. rotating said body relative to said cutting tool to a second position angularly spaced from said first position by an angle of 60° as measured about an axis at right angles to said surface of the body, d. forming, with said body in said second position and in the manner set out in step (b), a second set of parallel, spaced grooves of triangular cross-section in said surface of the body, the grooves of said second set being of the same depth as the grooves of said first set, e. rotating said body relative to the cutting tool to a third position angularly spaced from each of said first and second positions by an angle of 60° as measured about said axis and forming as in steps (b) and (d) a third set of parallel, spaced grooves of triangular cross section in said surface of the body, the grooves of said third set being of the same depth as the grooves of said first and second sets, and f. using the grooved surface of the body as a pattern to produce the required mould part.

Figure 2:
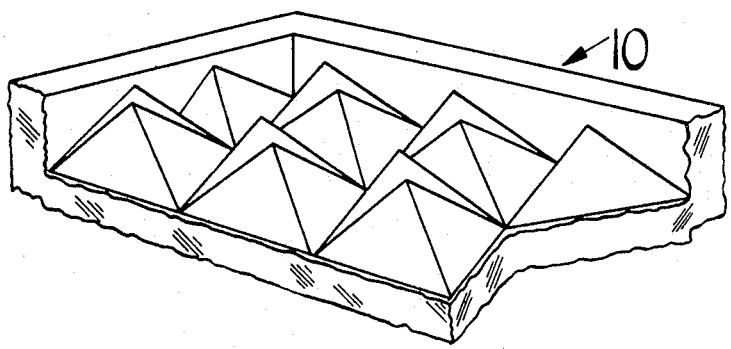
Figure 3:
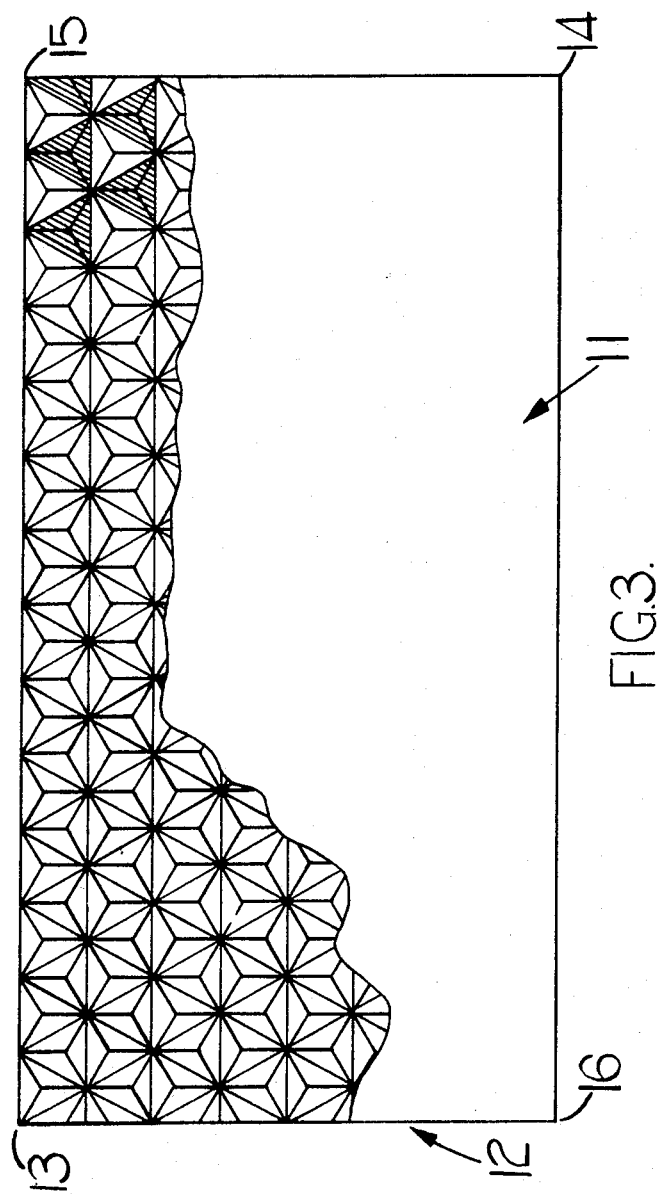

In the accompanying drawings,

FIG. 1 is an inverted plan view of a reflector panel produced from a mould part manufactured by a method according to one example of the invention, FIG. 2 is an enlarged perspective view of part of the reflector shown in FIG. 1, and FIG. 3 is a plan view illustrating one stage during the manufacture of the mould part used to produce the reflector shown in FIGS. 1 and 2.

Referring to the drawings, it is required to manufacture a mould part for use in moulding a rectangular reflector panel 10 (FIGS. 1 and 2). The reflector panel 10 is moulded in a transparent synthetic resin material, and includes a planar portion, one surface of which is flat, and the other surface of which is multi-faceted. A peripheral flange surrounds the planar portion of the panel, and by means of the flange the reflector panel is secured in position on, for example, the body or rear light assembly of a road vehicle. The mould part which is to be manufactured is required to define the contours of the multi-faceted surface of the planar portion of the reflector panel, and is produced in the manner now to be described.

A rectangular plate 11 is supported on a horizontal workpiece supporting platen adjacent a rotatable cutter (not shown) which carries a wedge-shaped cutting insert. The cutting insert is a diamond of high surface finish and has the configuration of a rectangular pyramid with the apical angle of the pyramid being held at 70° 46' within a tolerance range of between 1 and 2 minutes. The rotatable cutter is moved to a position spaced from one transversely extending side 12 of the plate 11 with the cutting edge of the insert parallel to the longitudinal sides 13 of the plate and in a plane below the upper surface of the plate. The cutting body is then rotated relative to the workpiece supporting platen and the plate 11 is moved longitudinally towards the cutting insert which as it rotates cuts a groove in the upper surface of the plate 11, the plate 11 being moved until a groove is cut along its whole longitudinal length. The cutting insert in cross-section defines an isoceles triangle, so that the walls of the groove formed in the plate 11 are inclined at the same angle to the upper surface of the plate. Also the spacing between the cutting body and the plate 11 is accurately maintained during cutting of the groove so that the groove is of a uniform depth of 0.037 inch along the length of the plate 11. When the longitudinal groove has been cut in the plate 11, the plate is moved in a direction parallel with the side 12 of the plate by a predetermined distance of 0.078 inch relative to the insert and a further longitudinal groove is cut in the plate parallel with and equal in dpeth to the first groove, but spaced therefrom. The plate is then again moved in the direction parallel with the side 12 by said predetermined distance relative to the insert and the cycle is repeated until a first series of parallel, spaced grooves extending along the longitudinal length of the plate and over the whole area of the plate have been produced.

The plate 11 is then rotated through an angle of 60° about an axis perpendicular to the upper surface of the plate and starting adjacent one corner 13 of the plate a second series of parallel grooves are cut in the upper surface of the plate, the grooves being equal in depth to the first set of grooves but being at an angle of 60° thereto. The cutting of this second series of grooves is continued until the corner 14 of the plate diametrically opposite the corner 13 is reached, the spacing between the grooves being maintained at said predetermined distance.

On completion of the second series of grooves the plate 11 is rotated through a further 60° about said axis and in the same direction as the first rotational movement of the plate. Then beginning adjacent a further corner 15 of the plate a third series of parallel grooves are cut in the upper surface of the plate equal in depth to the first and second series of grooves but at an angle of 60° thereto, the grooves passing through respective intersections of the first and second series of grooves. The cutting of this third series of grooves is continued until the corner 16 of the plate diametrically opposite the corner 15 is reached, the spacing between adjacent grooves again being kept at said predetermined distance.

The depth of the grooves, the spacing of adjacent grooves in each series of grooves, and the included angle of each groove, are chosen such that a series of right triangular corner cube prisms are defined on the plate 11. Thus, as can be seen from FIG. 3, the finished plate is formed with a series of rows of pyramidal projections extending parallel to the longitudinal sides of the plate and including first and second sets of rows of projections with the projections of the second set identical with, but oppositely orientated to the projections of the first set, and the edges of the bases of the projections being common to those of adjacent projections.

The indented surface of the plate 11 is then used as a master pattern to form a mould part (not shown) by conventional techniques such as electroplating. The mould part as produced has of course a plurality of indentations in one surface thereof corresponding to the pyramidal projections respectively defined on the plate 11. The mould part is in turn used as an insert for a mould, the remainder of the mould defining the flat front surface of the reflector panel 10, and the peripheral flange of the panel. The reflector panel 10 produced from the mould will thus have a flat front surface, and a rear surface including a plurality of rows of triangular pyramids. The imaginary bases of the pyramids lie in the orientation of the indentations in the mould part, that is to say that a first side of each of the imaginary bases of the pyramids in the first row is aligned with and touches a first side of the base of the adjacent pyramids in the first row. The pyramids of the second row are identical to the pyramids of the first row but are rotated through 180° with respect thereto. A first side of each of bases in the second row is aligned with and touches the first side of the bases of the adjacent pyramids and the first sides of the bases in the second row are parallel to the first sides of the bases in the first row. The second and third sides of each base in the second row is constituted by second and third sides of adjacent bases in the first row. The further pairs of rows are similar to the pair of rows constituted by the first and second rows with the aligned touching sides of the bases in the nth row, where n is an even number, constituted by the aligned touching sides of the bases in the ($n+1$)th row and the non-aligned sides of each of the bases in the nth row constituted by non-aligned sides of a pair of adjacent bases in the ($n-1$)th row.

In use the reflector panel 10 is mounted on the body of a road vehicle, with the plain surface outermost, and light impinging on the panel enters the panel and is reflected from the numerous facets defined by the faces of the triangular pyramids on the rear surface of the panel. The apical angle of the pyramids on the rear surface of the panel is so chosen that the panel exhibits the desired reflective characteristics.

I claim:

1. A method of manufacturing a mould part for use in the manufacture of a reflector panel for a road vehicle, comprising the steps of:
    a. locating a body in a first position relative to a rotatable cutting tool, the body having a substantially flat surface and the cutting tool carrying a diamond cutting insert which is of rectangular pyramidal configuration and in cross-section defines an isosceles triangle,
    b. rotating the cutting tool whilst providing relative movement between the body and the tool in a first direction parallel with said flat surface of the body so as to cut a first set of parallel, spaced grooves of triangular cross-section and of equal depth in said surface of the body,
    c. rotating said body relative to said cutting tool to a second position angularly spaced from said first position by an angle of 60° as measured about an axis at right angles to said surface of the body,
    d. forming, with said body in said second position and in the manner set out in step (b), a second set of parallel, spaced grooves of triangular cross-section in said surface of the body, the grooves of said second set being of the same depth as the grooves of said first set,
    e. rotating said body relative to the cutting tool to a third position angularly spaced from each of said first and second positions by an angle of 60° as measured about said axis and forming as in steps (b) and (d) a third set of parallel spaced grooves of triangular cross-section in said surface of the body, the grooves of said third set passing through the intersections of the grooves of the first and second sets and being of the same depth as the grooves of said first and second sets, and
    f. electro-plating the grooved surface of the body produced after step (e) to produce the required mould part.

* * * * *